United States Patent
Davis (10) Patent No.: US 10,380,003 B2
(45) Date of Patent: *Aug. 13, 2019

(54) DIAGNOSTIC WORKFLOW FOR PRODUCTION DEBUGGING

(71) Applicant: MICROSOFT TECHNOLOGY LICENSING, LLC., Redmond, WA (US)

(72) Inventor: Jackson Davis, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/441,235

(22) Filed: Feb. 24, 2017

(65) Prior Publication Data

US 2017/0300400 A1    Oct. 19, 2017

Related U.S. Application Data

(63) Continuation of application No. 14/527,568, filed on Oct. 29, 2014, now Pat. No. 9,612,939.

(51) Int. Cl.
*G06F 11/00* (2006.01)
*G06F 11/36* (2006.01)

(52) U.S. Cl.
CPC ......... *G06F 11/366* (2013.01); *G06F 11/362* (2013.01); *G06F 11/3636* (2013.01); *G06F 11/3644* (2013.01); *G06F 11/3664* (2013.01)

(58) Field of Classification Search
CPC .. G06F 11/366; G06F 11/362; G06F 11/3636; G06F 11/3644; G06F 11/3664; G06F 11/36; G06F 11/3612; G06F 11/364
See application file for complete search history.

(56) References Cited

U.S. PATENT DOCUMENTS

| | | |
|---|---|---|
| 5,450,586 A | 9/1995 | Kuzara et al. |
| 5,621,886 A | 4/1997 | Alpert et al. |
| 6,219,803 B1 | 4/2001 | Casella et al. |

(Continued)

FOREIGN PATENT DOCUMENTS

| | | |
|---|---|---|
| CN | 1271896 A | 11/2000 |
| CN | 102129408 A | 7/2011 |

(Continued)

OTHER PUBLICATIONS

"Debugging Programs in a Production Environment", Retrieved From<<http://www.ibm.com/support/knowledgecenter/SSQ2R2_9.0.1/com.ibm.ent.dbt.zos.doc/topics/eqabug0049.htm>>, Retrieved on: Sep. 26, 2014, 5 Pages.

(Continued)

*Primary Examiner* — Joseph D Manoskey (57) ABSTRACT

A diagnostic workflow file can be used to control the future diagnostic actions taken by a debugger without user interaction with the debugger when it executes. The diagnostic workflow file is used by a debugger during a debug session. The debugger performs the actions directed by the diagnostic workflow file to simulate an interactive live debug session. The diagnostic workflow file can include conditional diagnostic operations whose execution depends on the state of program variables, diagnostic variables and diagnostic primitives in the debug session.

20 Claims, 4 Drawing Sheets

(56) References Cited

U.S. PATENT DOCUMENTS

| | | |
|---|---|---|
| 6,282,701 B1 | 8/2001 | Wygodny et al. |
| 6,349,406 B1 | 2/2002 | Levine et al. |
| 6,671,825 B1 | 12/2003 | Joshi et al. |
| 6,745,344 B1 | 6/2004 | Joshi et al. |
| 6,854,073 B2 | 2/2005 | Bates et al. |
| 6,901,581 B1 | 5/2005 | Schneider |
| 6,981,243 B1 | 12/2005 | Browning et al. |
| 7,047,519 B2 | 5/2006 | Bates et al. |
| 7,222,264 B2 | 5/2007 | Muratori et al. |
| 7,716,643 B2 | 5/2010 | Goldin |
| 7,849,445 B2 | 12/2010 | Tran |
| 7,870,356 B1 | 1/2011 | Veeraswamy et al. |
| 8,060,866 B2 | 11/2011 | Weatherbee et al. |
| 8,090,989 B2 | 1/2012 | Law et al. |
| 8,091,074 B2 | 1/2012 | Lyon-Smith |
| 8,209,288 B2 | 6/2012 | Friedman et al. |
| 8,302,006 B2 | 10/2012 | Stanek et al. |
| 8,522,209 B2 | 8/2013 | Wintergerst et al. |
| 8,752,017 B2 | 6/2014 | Hossain et al. |
| 8,909,990 B2 | 12/2014 | Davis et al. |
| 8,935,673 B1 | 1/2015 | Ashkenazi et al. |
| 9,111,033 B2 | 8/2015 | Bates |
| 9,489,283 B1* | 11/2016 | Popovici ............ G06F 11/3636 |
| 9,612,939 B2 | 4/2017 | Davis |
| 2002/0073400 A1 | 6/2002 | Beuten et al. |
| 2002/0087950 A1 | 7/2002 | Brodeur et al. |
| 2002/0174416 A1 | 11/2002 | Bates et al. |
| 2003/0088854 A1 | 5/2003 | Wygodny et al. |
| 2004/0006760 A1 | 1/2004 | Gove et al. |
| 2005/0273490 A1 | 12/2005 | Shrivastava et al. |
| 2006/0059146 A1 | 3/2006 | Mcallister et al. |
| 2006/0143412 A1 | 6/2006 | Armangau |
| 2006/0288332 A1 | 12/2006 | Sagar et al. |
| 2007/0074168 A1 | 3/2007 | Bates et al. |
| 2007/0156485 A1* | 7/2007 | Sanabria ............... G06Q 10/06 705/7.26 |
| 2007/0168997 A1 | 7/2007 | Tran |
| 2007/0240125 A1 | 10/2007 | Degenhardt et al. |
| 2008/0120605 A1 | 5/2008 | Rosen |
| 2008/0134148 A1 | 6/2008 | Clark |
| 2008/0155330 A1 | 6/2008 | Van Wyk et al. |
| 2008/0164934 A1 | 7/2008 | Hankey et al. |
| 2008/0295077 A1 | 11/2008 | Sengupta et al. |
| 2009/0089801 A1 | 4/2009 | Jones et al. |
| 2009/0254821 A1 | 10/2009 | Cates |
| 2009/0271472 A1 | 10/2009 | Scheifler et al. |
| 2009/0307528 A1 | 12/2009 | Byers et al. |
| 2010/0115334 A1 | 5/2010 | Malleck et al. |
| 2010/0199265 A1 | 8/2010 | Maybee |
| 2011/0029821 A1 | 2/2011 | Chow et al. |
| 2011/0099538 A1 | 4/2011 | Naidu pujala et al. |
| 2011/0131295 A1 | 6/2011 | Jolfaei |
| 2011/0131553 A1 | 6/2011 | Singh |
| 2011/0145800 A1 | 6/2011 | Rao et al. |
| 2011/0307871 A1 | 12/2011 | Branda et al. |
| 2012/0005659 A1 | 1/2012 | Bonanno et al. |
| 2012/0033135 A1 | 2/2012 | Spinelli |
| 2012/0096441 A1 | 4/2012 | Law et al. |
| 2012/0102460 A1 | 4/2012 | Bates |
| 2012/0266140 A1 | 10/2012 | Bates |
| 2012/0324236 A1 | 12/2012 | Srivastava et al. |
| 2013/0036403 A1 | 2/2013 | Geist |
| 2013/0263094 A1 | 10/2013 | Bates et al. |
| 2013/0283243 A1 | 10/2013 | Bates et al. |
| 2013/0318504 A1 | 11/2013 | Eker et al. |
| 2013/0346814 A1 | 12/2013 | Zadigian et al. |
| 2014/0007058 A1 | 1/2014 | Bates et al. |
| 2014/0040669 A1 | 2/2014 | Davis et al. |
| 2014/0040897 A1 | 2/2014 | Davis et al. |
| 2014/0115566 A1 | 4/2014 | Cao |
| 2014/0317602 A1 | 10/2014 | Zuo |
| 2014/0366007 A1 | 12/2014 | Koltachev et al. |
| 2015/0052400 A1 | 2/2015 | Garrett et al. |
| 2015/0127991 A1 | 5/2015 | Davis et al. |
| 2015/0143344 A1 | 5/2015 | Davis |

FOREIGN PATENT DOCUMENTS

| | | |
|---|---|---|
| CN | 103365817 A | 10/2013 |
| EP | 1970803 A3 | 10/2010 |

OTHER PUBLICATIONS

"Introduction to Production Debugging for .NET Framework Applications", Retrieved From<<https://msdn.microsoft.com/en-us/library/ee817659.aspx>, Nov. 2002, 9 Pages.

"Monitoring and Diagnosing Production Applications Using Oracle Application Diagnostics for Java", In Oracle White Paper, Dec. 2007, 6 Pages.

"Using the Stream Insight Event Flow Debugger", Retrieved From <<https://msdn.microsoft.com/en-us/library/ff518532(v=sql.111).aspx>>, Aug. 26, 2014, 9 Pages.

"Non-Final Rejection Issued in U.S. Appl. No. 14/527,568", dated Jun. 17, 2016,12 Pages.

Langdon, Jon, "Production Diagnostics Improvements in CLR 4", Retrieved From <<http://msdn.microsofl.com/en-us/ magazine/ee336311.aspx>, May 2010, 5 pages.

"International Preliminary Report on Patentability Issued in PCT Application No. PCT/US2015/057277", dated Sep. 19, 2016, 7 Pages.

"International Search Report & Written Opinion Issued in PCT Application No. PCT/US2015/057277", dated Dec. 3, 2015, 12 Pages.

Tucek, et al., "Triage: Diagnosing Production Run Failures at the User's Site", In Proceedings of 21st ACM Symposium on Operating Systems Principles, SOSP '07, Oct. 14, 2007, 14 Pages.

"Notice of Allowance Issued in U.S. Appl. No. 14/527,568", dated Dec. 14, 2016, 2 Pages.

"Notice of Allowance Issued in U.S. Appl. No. 14/527,568", dated Nov. 29, 2016, 5 Pages.

"Collecting Performance Snapshots Using vm-Support", In the VMware Knowledge Base, Retrieved Date: Apr. 20, 2012, 1 Page.

"Debugging Dynamic Memory Usage Errors Using HP WDB", Retrieved From <<https://support.hpe.com/hpsc/doc/public/display?docId=emr_na-c0272589>> Jan. 2011, 109 Pages.

"Debugging with GOB: the GNU Source-Level Debugging", Retrieved From <<http://mermaja.act.uji.es/docencia/is37/data/gdb.pdf>>, Dec. 15, 2010, 103 Pages.

"Details—Microsoft Knowledge Base", Available at: https://www.microsoft.com/en-in/?evtsrc=microsoft.repo-%20rtingservices.diagnostics.utilities.errorstrings.resources.strings&evtid=r-%20sreporthistorynotfound&prodname=sql%20server%20reporting%20services&prodve-%20r=8.00&lcid=1033, Retrieved Date: Apr. 20, 2012, 1 Page.

"Xcode OpenGL ES Tools Overview", Retrieved From: https://developer.apple.com/library/ios/documentation/3DDrawing/Conceptual/OpenGLES_ProgrammingGuide/ToolsOverview/ToolsOverview.html, Retrieved on Jun. 5, 2014, 12 Pages.

"Xcode Overview", Retrieved From: https://developer.apple.com/library/archive/documentation/ToolsLanguages/Conceptual/Xcode_Overview/index.html, Mar. 10, 2014, 18 Pages.

"Non Final Office Action Issued in U.S. Appl. No. 13/567,034", dated Apr. 4, 2014, 19 Pages.

"Final Office Action Issued in U.S. Appl. No. 14/083,157", dated Mar. 17, 2016, 23 Pages.

"Final Office Action Issued in U.S. Appl. No. 14/083,157", dated Apr. 20, 2017, 30 Pages.

"Final Office Action Issued U.S. Appl. No. 14/083,157", dated Jul. 26, 2017, 31 Pages.

"Non Final Office Action Issued in U.S. Appl. No. 14/083,157", dated Jan. 25, 2018, 37 Pages.

"Non-Final Office Action Issued in U.S. Appl. No. 14/083,157", dated Sep. 9, 2016, 33 Pages.

"Non-Final Office Action Issued in U.S. Appl. No. 14/083,157", dated Sep. 17, 2015, 24 pages.

"Notice of Allowance Issued in U.S. Appl. No. 14/083,157", dated Sep. 21, 2018, 16 Pages.

(56) References Cited

OTHER PUBLICATIONS

"Final Office Action Issued in U.S. Appl. No. 14/563,822", dated May 31, 2017, 25 Pages.
"Final Office Action Issued in U.S. Appl. No. 14/563,822", dated Jul. 22, 2016, 16 Pages.
"Non-Final office Action Issued in U.S. Appl. No. 14/563,822", dated Nov. 17, 2016, 22 Pages.
"Non-Final Office Action Issued in U.S. Appl. No. 14/563,822", dated Mar. 8, 2016, 18 Pages.
"Office Action Issued in European Patent Application No. 14805759.9", dated Oct. 23, 2018, 6 Pages.
"First Office Action and Search Report Issued in Chinese Patent Application No. 201380041353.X", dated Jul. 4, 2016, 14 Pages.
"Fourth Office Action Issued in Chinese Patent Application No. 201380041353.X", dated Mar. 9, 2018, 6 Pages.
"Office Action Issued in Chinese Patent Application No. 201380041353.X", dated Jan. 20, 2017, 13 Pages.
"Third Office Action Issued in Chinese Patent Application No. 201380041353.X", dated Aug. 2, 2017, 11 Pages.
"First Office Action and Search Report Issued in Chinese Patent Application No. 201480062946.9", dated Jan. 17, 2018, 15 Pages.
"Office Action Issued in Chinese Patent Application No. 201480062946.9", dated Aug. 2, 2018, 7 Pages.
"First Office Action and Search Report Issued in Chinese Application No. 201580028549.4", dated Aug. 30, 2018, 20 Pages.
Aniyan, Mathew, "New CodeLens Indicator-Incoming Changes", Retrieved From: https://blogs.msdn.microsoft.com/visualstudioalm/2014/03/03/new-codelens-indicatorincoming-changes/, Mar. 3, 2014, 18 Pages.
Avaya, "SCS 4.0 Diagnostics Task Based Guide", https://downloads.avaya.com/css/P8/documents/100122211, 2010, 53 Pages.
Graham, et al., "Gprof: A Call Graph Execution Profiler", In Proceedings of the SIGPLAN Symposium on Compiler Construction, vol. 17, Issue 6, Jun. 23, 1982, pp. 120-126.
Hewardt, et al., "Advanced Windows Debugging", Published in Pearson Education, Oct. 2007, pp. 124-153.
Khouzam, Marc, "Real-Time Debugging Using GDB Tracepoints and Other Eclipse Features", In GCC Summit, Oct. 26, 2010, 44 Pages.
Lee, et al., "A Development of Remote Tracepoint Debugger for Run-time Monitoring and Debugging of Timing Constraints on Qplus-P RTOS", In Proceedings of the IEEE Workshop on Software Technologies for Future Embedded Systems, May 15, 2003, 4 Pages.
Malony, et al., "Overhead Compensation in Performance Profiling", In Lecture Notes in Computer Science vol. 3149, Oct. 2004, 14 Pages.
Nethercote, et al., "Valgrind: A Framework for Heavyweight Dynamic Binary Instrumentation", In Proceedings of the 28th ACM SIGPLAN Conference on Programming Language Design and Implementation, vol. 42, Issue 6, Jun. 1, 2007, pp. 89-100.
"International Search Report and Written Opinion issued for PCT Application No. PCT/US2013/053110", dated Nov. 11, 2013, 11 Pages.
"International Preliminary Report on Patentability Issued in PCT Application No. PCT/US2014/065592", dated Jan. 28, 2016, 9 Pages.
"International Search Report and Written Opinion Issued in PCT Application No. PCT/US2014/065592", dated May 18, 2015, 19 Pages.
"Second Written Opinion Issued in PCT Application No. PCT/US2014/065592", dated Oct. 28, 2015, 6 Pages.
"International Search Report & Written Opinion Issued in PCT Application No. PCT/US2015/032089", dated Jul. 31, 2015, 11 Pages.
Plank, et al., "Libckpt: A Transparent Checkpointing under Unix", In Proceedings of Usenix Winter Technical Conference, Jan. 1995, pp. 213-223.
Plank, et al., "Memory Exclustion: Optimizing the Performance of Checkpointing Systems", In Journal of Software—Practice & Experience, vol. 29, Issue 2, Feb. 1999, pp. 125-142.
Sedlacek, Jiri, "Profiling With VisualVM, Part 1", The NetBeans Profiler and VisualVM Blog, Jul. 28, 2008, 7 Pages.
Strein, et al., "Design and Implementation of a high-level multi-language .NET Debugger", The third International Conference on .NET Technologies, May 31, 2005, pp. 57-64.
Wang, et al., "An Effective Reversible Debugger of Cross Platform Based on Virtualization", In International Conference on Embedded Software and Systems, May 25, 2009, pp. 448-453.
"Office Action Issued In European Patent Application No. 15728297.1", dated: Apr. 2, 2019, 9 pages.

* cited by examiner

DIAGNOSTIC WORKFLOW FOR PRODUCTION DEBUGGING

BACKGROUND

Traditional software diagnostic tools typically operate on a live, running process or on saved process state. For example, a live debugger runs on an executing process. A debugger that executes on saved process state does not attach to an executing process and operates by processing a process dump file or historical log files collected while the process being debugged executes. This type of debugger executes separately from the process being debugged, typically sometime after the process being debugged is done executing. Debugging a live process provides little or no historical context about how a process reached its current state. Debugging process dump files and/or log files is typically time consuming and iterative.

SUMMARY

A diagnostic tool can perform live-type debugging on a process as directed by a diagnostic workflow artifact without stopping the process. The diagnostic tool can perform conditional or unconditional breakpoint processing and conditional or unconditional exception processing in a fashion similar to that used for live debugging but without the performance impact that live debugging typically has on a process. "Production" or a "production environment" as used herein refers to an environment in which the software being used has exited from the development and/or testing stage and is "in production" that is, being used to perform actual work rather than being developed and/or tested. The instructions provided in a diagnostic workflow file can be used to control future diagnostic operations of a debugger automatically (without user interaction with the debugger as the debugger executes). Diagnostic operations specified in the diagnostic workflow file can be performed conditionally based on current state of an executing application. "Current state" can include the state of diagnostic primitives. A diagnostic primitive is any operation that impacts the state of the diagnostic tool such as but not limited to creating breakpoints, removing breakpoints, disabling breakpoints, changing the condition of a breakpoint, enabling an exception based on the type of the exception, disabling an exception based on the type of the exception, conditioning exceptions based on the call stack associated with the exception, stepping operations such as stepping into code, stepping over an instruction, etc. and stepping out of code. "Current state" can include the state of various variables including but not limited to program variables and diagnostic variables. Program variables refer to those variables that the program being debugged uses. Diagnostic variables (such as, for example, the value of a variable that holds the number of times a particular breakpoint has been hit, or if an exception of a specified type has been thrown, or if the exception has been thrown at a specified call stack) refer to those variables that are used by the debugger for debugging.

The diagnostic workflow file can be generated from an integrated development environment (IDE) or other development environment. The diagnostic workflow can enable diagnostic actions to be performed automatically (without human interaction) while a program is executing. Diagnostic actions include but are not limited to the following: a breakpoint can be enabled when a specified event occurs, a breakpoint can be disabled when a specified event occurs, a break in program processing or generation of a dump can be enabled when an exception is first thrown, a break in program processing or generation of a dump can be enabled when an exception of a specified type is first thrown, a break in program processing or generation of a dump can be enabled when an exception is first thrown at a particular call stack or at a particular line, the type of the exception can be used as a secondary condition for the break or dump generation, diagnostic logging can be enabled when one of the above conditions occurs, and/or diagnostic logging can be disabled when one of the above conditions occurs, a stepping operation can be performed, a variable can be evaluated, a variable can be written to a log and so on. That is, any action supported by the diagnostic tool that a user would be able to perform directly when the user is in control of the debugger can be can performed automatically driven by the workflow file.

The diagnostic workflow file can be provided to a debug session in a production or non-production environment. The diagnostic workflow can be applied to a live debugging session in a production environment. Actions described in the workflow can dynamically control a debugger or other diagnostic tool without user interaction. The state of the conditions specified in the diagnostic workflow can be made visible in each generated diagnostic artifact. A diagnostic artifact can include a live debugging session, lightweight process snapshots, or process dumps generated from either live processes or from lightweight process snapshots.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A live debugger can provide a user with fine-grained control over debug actions because a user is directly interacting with (controlling the actions of) the debugger. For example, in live debugging, the user can insert a breakpoint into source code. When the breakpoint is encountered during execution of the program, the target process is typically stopped and control of the process is turned over to the user. The user can then perform various debug operations including enabling or disabling a breakpoint, inspecting variable values, inspecting the call stack, and so on. When the user has finished his debug actions, he can direct the processor to resume execution of the application. When debugging an application that it is not reasonable to stop because of the impact on users (e.g., an application running in a production environment), a user has to guess what information he or she will need to collect and put logging statements in the application to collect that information. Typically this historical information is evaluated offline.

In accordance with some aspects of the subject matter described herein, instructions provided in a diagnostic workflow file can be used to control future diagnostic operations of a debugger without user interaction with the debugger while the debugger is executing. The instructions in the diagnostic workflow file can be executed conditionally. The instructions in the diagnostic workflow file can be executed conditionally based on any combination of the state of: one or more program variables, one or more diagnostic primitives and/or one or more diagnostic variables. A program variable is a variable that is needed by the program. A diagnostic variable is a variable that is needed by the diagnostic tool. A condition that determines whether the instruction in the diagnostic workflow file is executed can include specifying a value of a program variable (e.g., "if an integer variable "i" in the program has the value 13, perform the action"). A condition can also be based on state such as "if the executing thread is named 'squid' or the process's name is 'clam' perform the action". The condition can be based on the state of one or more diagnostic primitives. A diagnostic primitive can be any operation which impacts the state of the debugger including but not limited to creating, removing, enabling or disabling breakpoints, changing the condition of a breakpoint (e.g., changing a breakpoint from enabled to disabled or changing a condition on which the breakpoint is executed), enabling or disabling an exception by type, conditioning exceptions by call stack, or debugger operations such as invoking a step operation (step in, step over, step out). The condition can be based on the state of a diagnostic variable such as but not limited to, for example, the value of a variable that specifies the number of times a particular breakpoint has been hit, or if an exception of a specified type has been thrown, or if the exception has been thrown at a specified call stack.

The conditional diagnostic instructions can be inserted dynamically into a running application in any suitable way. In accordance with some aspects of the subject matter described herein, conditional diagnostic instructions can be inserted dynamically into a running application by, for example, injecting a function call into a snapshot runtime. Each instance of the injected breakpoint can be given a unique identifier at runtime. The unique identifier can be passed to the diagnostic runtime when the breakpoint is hit. The workflow execution environment can then find the particular breakpoint in the diagnostic workflow file and apply the action specified there.

Conditional or unconditional breakpoints and/or conditional or unconditional exception processing inserted into an executing application can be non-stopping. When the instrumented code is executed and a non-stopping breakpoint is encountered, instead of stopping the process and turning control over to a user, additional processing directed by the contents of the diagnostic workflow file can be performed without user interaction. Diagnostic information can be collected. The diagnostic information collected can include a lightweight snapshot of the process state.

Diagnostic Workflow for Production Debugging

A diagnostic workflow file can be created that includes diagnostic instructions that can be conditionally or unconditionally performed in a running application. The diagnostic workflow file can be used to specify conditional or unconditional breakpoint processing that is to be inserted into executing code and conditional or unconditional exception processing that is to be performed in a fashion similar to that used for live debugging. Instead of initiating live debugging, the list of breakpoint binding locations, exception status, and compiled versions of the conditions can be exported to the diagnostic workflow file. The diagnostic workflow file can be applied to a running application (e.g., using code injection techniques, code rewriting mechanisms, etc.). The application can be executing in a production or non-production (e.g., development, test, staging, etc.) environment.

A workflow comprising one or more instructions for one or more uniquely-identified breakpoints can be specified in the diagnostic workflow file. A workflow comprising one or more instructions for one or more types of exceptions can be specified in the diagnostic workflow file. Exceptions can be identified by, for example, the exception type (or integer code, depending on the type of the exception), by the call stack where the exception is being thrown from, by the catch block that is catching the exception and so on. After the processing that is to occur in the diagnostic session has been specified, in accordance with some aspects of the subject matter described herein, the diagnostic workflow file can be compiled. When the target application is executed, the diagnostic workflow file can be consumed by a diagnostic workflow engine.

Figure 1:
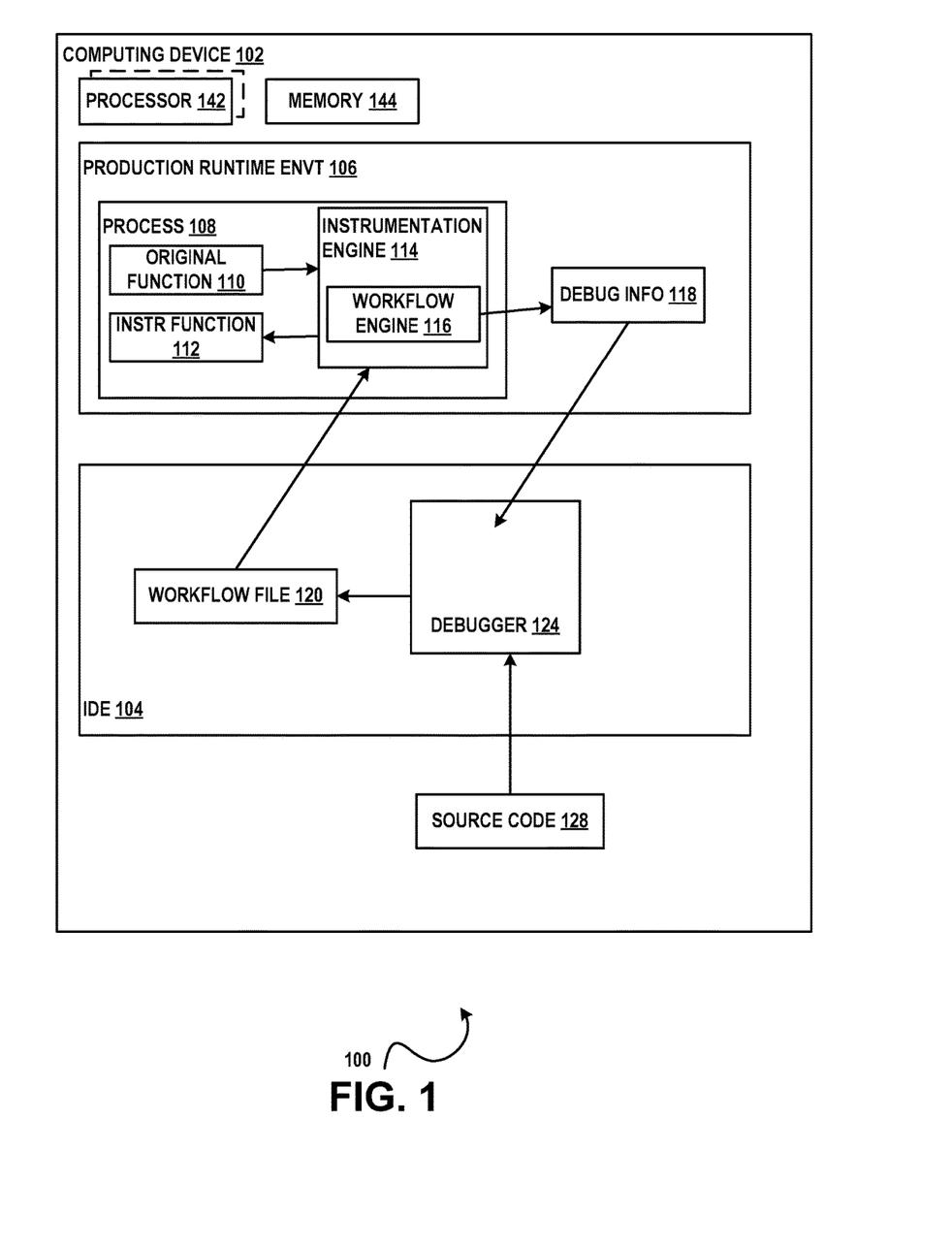
FIG. 1 illustrates an example of a system 100 for generating and/or executing a diagnostic workflow in accordance with aspects of the subject matter described herein.

The diagnostic workflow engine can perform debug operations as directed by the diagnostic workflow file. The diagnostic workflow engine can initialize the state (e.g., to enabled or disabled) for each production diagnostic event according to the description in the workflow. For example, if a breakpoint (e.g., breakpoint 1) is to be enabled when another event occurs, breakpoint 1 can be initialized to the "disabled" state. The breakpoints and exception handlers can be injected into the process using a runtime profiler such as a common language runtime (CLR) intermediate language (IL) rewriting profiler or any other suitable code rewriting technique. This allows the diagnostic tool to trap various events, evaluate execute conditions, and eventually trigger the handler for the event. The processing specified may include creating a snapshot. The snapshot may be a lightweight process snapshot. The snapshot may reside in memory and may be accessed by a diagnostic tool such as a debugger. The snapshot may be serialized to a memory dump. The memory dump may be consumed offline by a diagnostic tool. At runtime, as each event specified in the diagnostic workflow file occurs on the computing device, the instrumentation injected by the instrumentation engine can make calls to the workflow engine to perform actions as described in the diagnostic workflow file such as enabling or disabling one or more different breakpoints, walking a call stack, type checking an exception and can perform one or more actions based on the result of the specified processing FIG. 1 illustrates an example of a system 100 that can perform debugging based on a diagnostic workflow file in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 may execute wholly or partially within an IDE such as IDE 104 or can execute wholly or partially outside an IDE. IDE 104 can be an IDE such as the one described with respect to FIG. 4 or can be any other IDE. All or portions of system 100 may be implemented as a plug-in or add-on.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors.

System 100 may include any one of or any combination of program modules comprising: an instrumentation engine such as instrumentation engine 114, a diagnostic workflow engine such as workflow engine 116 and/or a debugger or diagnostic tool such as debugger 124. An instrumentation engine such as instrumentation engine 114 can include a diagnostic workflow engine such as workflow engine 116. The diagnostic workflow engine can be external to the instrumentation engine. System 100 can include an execution environment such as production runtime environment 106. Alternatively the execution environment can be a development, staging or testing environment. System 100 can include a second environment such as but not limited to a development environment represented in FIG. 1 by IDE 104.

In accordance with some aspects of the subject matter described herein, a diagnostic workflow file such as diagnostic workflow file 120 can be created can be created by debugger 124 in response to receiving input such as source code 128. The diagnostic workflow file can be used to control future diagnostic operations of a debugger without user interaction with the debugger as the debugger executes. Diagnostic operations specified in the diagnostic workflow file can be performed conditionally based on current state of an executing application. "Current state" can include the state of diagnostic primitives, (e.g., whether or not a certain breakpoint has been hit, whether or not an exception has been thrown) and the state of various variables (such as, for example, the value of a variable that holds the number of times a particular breakpoint has been hit, or if an exception of a specified type has been thrown, or if the exception has been thrown at a specified callstack) or a combination thereof. A diagnostic primitive can be any operation which impacts the state of the debugger including but not limited to creating, removing, or disabling breakpoints, changing the condition of a breakpoint (e.g., from enabled to disabled or from disabled to enabled), enabling or disabling an exception by type, conditioning exceptions based on the call stack the exception is thrown at, or debugger operations such invoking a step operation (step in, step over, step out), etc.

The diagnostic workflow file 120 may be compiled. The diagnostic workflow file 120 or the compiled diagnostic workflow file may be provided to an instrumentation engine 114. The instrumentation engine 114 can dynamically, without taking down or stopping the executing process 108, instrument an original function 110 to create an instrumented function 112. The next time the function is invoked, the instrumented function 112 can be executed instead of the original function 110. In accordance with some aspects of the subject matter described herein, the original function 110 is rewritten to create the instrumented function 112 using a code rewriting mechanism. In accordance with some aspects of the subject matter described herein, the original function 110 is rewritten to create the instrumented function 112 by the instrumentation engine 114.

A diagnostic workflow engine such as workflow engine 116 may perform the processing specified in the diagnostic workflow file 120. For example, the diagnostic workflow engine may enable a second breakpoint (breakpoint B) if a first breakpoint (breakpoint A) has already been encountered. The diagnostic workflow engine may enable a particular breakpoint if an exception of a specified type is thrown. The diagnostic workflow engine may enable a particular breakpoint if an exception of a specified type is thrown at a specified call stack. The diagnostic workflow engine may enable a second conditional breakpoint (breakpoint B) if a first conditional breakpoint (breakpoint A) is not hit because for example, the conditions required for the first conditional breakpoint to fire are not met. The diagnostic workflow engine may disable a particular breakpoint if an exception of a specified type is thrown. The diagnostic workflow engine may disable a second breakpoint (e.g., breakpoint B) if the second breakpoint is encountered in a different session or process than a first breakpoint (e.g., breakpoint A). The diagnostic workflow engine may enable a particular breakpoint if a section of code takes longer than a threshold value to execute (e.g., the section of code may be dependent on events that affect performance). The diagnostic workflow engine may enable creation of a dump at a first chance exception of a specified type if a specified breakpoint has been hit. The diagnostic workflow engine may disable creation of a dump at a first chance exception of a particular type if a particular specified breakpoint has been hit. The diagnostic workflow engine may enable a particular breakpoint if the exception is encountered on the same thread as a second identified breakpoint. The diagnostic workflow engine such as diagnostic workflow engine 116 can collect and persist and/or save debug information (debug artifacts) such as debug information 118.

Figure 2:
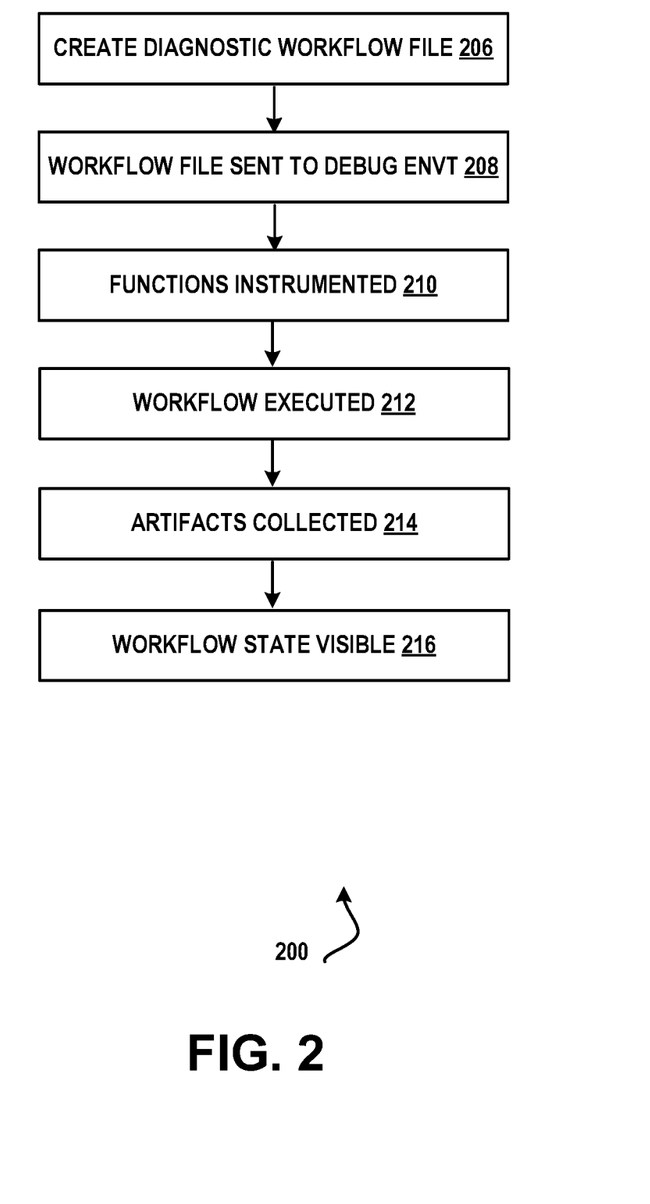
FIG. 2 illustrates an example of a method 200 comprising an example of a method of generating a diagnostic workflow and/or performing the diagnostic workflow in accordance with aspects of the subject matter disclosed herein.

FIG. 2 illustrates an example of a method 200 for creating and executing a diagnostic workflow file in accordance with aspects of the subject matter described herein. The method described in FIG. 2 can be practiced by a system such as but not limited to the one described with respect to FIG. 1. While method 200 describes a series of steps or operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

At operation 206 a diagnostic workflow file can be created as described more fully above. The diagnostic workflow file can be compiled. At operation 208 the diagnostic workflow file can be sent to the debug environment. The diagnostic workflow file can be received from a development, test or staging computing machine. The diagnostic workflow file can be received by a production runtime environment on the same computing device or on another computing device.

At operation 210 a function can be instrumented to produce an instrumented function that is executed the next time the function is called. The function can be instrumented by one or more program modules loaded into a memory connected to a processor of a computing machine. At operation 212 the instrumented function can be executed.

The instrumented function can be executed by a processor of a computing device. The instrumented function can be processed by a diagnostic workflow engine which determines state and can execute the diagnostic operations specified in the diagnostic workflow file as described more fully above. At operation 214 debug information (e.g., diagnostic artifacts) can be collected. At operation 216 workflow state can be provided. The workflow state may be provided as a display, report, written to a storage medium or by any means known to those of skill in the art.

In accordance with aspects of the subject matter described herein, a computer system can include one or more processors, a memory connected to one or more processors and a diagnostic tool. The diagnostic tool can include one or more program modules that when loaded into the memory can cause the one or more processors to creating a diagnostic workflow file. The diagnostic workflow file can control future diagnostic operations of a debugger automatically (without user interaction with the debugger as the debugger executes). The diagnostic workflow file can include one or more diagnostic operations. The diagnostic workflow file can specify that a diagnostic operation is conditional based on current state of an executing program. Current state can include the state of one or more diagnostic primitives. Current state can include the state of one or more diagnostic variables. Current state can include the state of one or more program variables. The execution of a conditional diagnostic operation can depend on a combination of state of one or more diagnostic primitives, one or more program variables and one or more diagnostic variables.

A method of using a system such as the system described above can include operations such as receiving a diagnostic workflow file by a processor of a computing device. The diagnostic workflow file can include one or more conditional diagnostic operations to be performed where the conditional diagnostic operation is executed depending on the current state of one or more of a program variable, a diagnostic primitive and a diagnostic variable. The current state of the one or more program variables, diagnostic primitives and/or diagnostic variables can be determined. In response to determining that the conditions are met, diagnostic information can be collected. Diagnostic information can be collecting by making a snapshot of process data. The state of the diagnostic information can be displayed (e.g., to a user). A diagnostic primitive can be an instruction to create a breakpoint, remove a breakpoint, enable a breakpoint, disable a breakpoint, change a condition of a breakpoint, enable an exception based on the type of the exception, disable an exception based on the type of the exception, condition an exception based on the call stack the exception is thrown at, perform a debug operation such as a step operation. The state of a diagnostic variable can be determined. A diagnostic variable can be a variable used in a debug operation in the diagnostic workflow file.

A computer-readable storage medium can include computer-readable instructions which when executed cause one or more processors of a computing device to use the instructions provided in the diagnostic workflow file to automatically control diagnostic operations of an instrumented executable in a target process (process being debugged). The instructions can cause the processor to collect diagnostic information. The computer-readable storage medium can include other computer-readable instructions that collected diagnostic information to be provided to a diagnostic tool such as a debugger. The computer-readable storage medium can include other computer-readable instructions that when executed insert instrumented code into a function to generate an instrumented function while the target process executes. The computer-readable storage medium can include other computer-readable instructions that when executed determine state of a diagnostic primitive. A diagnostic primitive can be an operation such as: creating a breakpoint, removing a breakpoint, enabling a breakpoint, disabling a breakpoint, changing a condition of a breakpoint, enabling an exception if it is a specified type, disabling an exception if it is a specified type, conditioning an exception based on if the exception is thrown at a specified call stack executing a step operation. The computer-readable storage medium can include other computer-readable instructions that when executed determine state of a diagnostic variable that is used to perform debug operations. The computer-readable storage medium can include other computer-readable instructions that when executed determine current state of a diagnostic primitive. The computer-readable storage medium can include other computer-readable instructions that when executed determine state of a diagnostic variable referenced in the diagnostic workflow file.

Example of a Suitable Computing Environment

Figure 3:
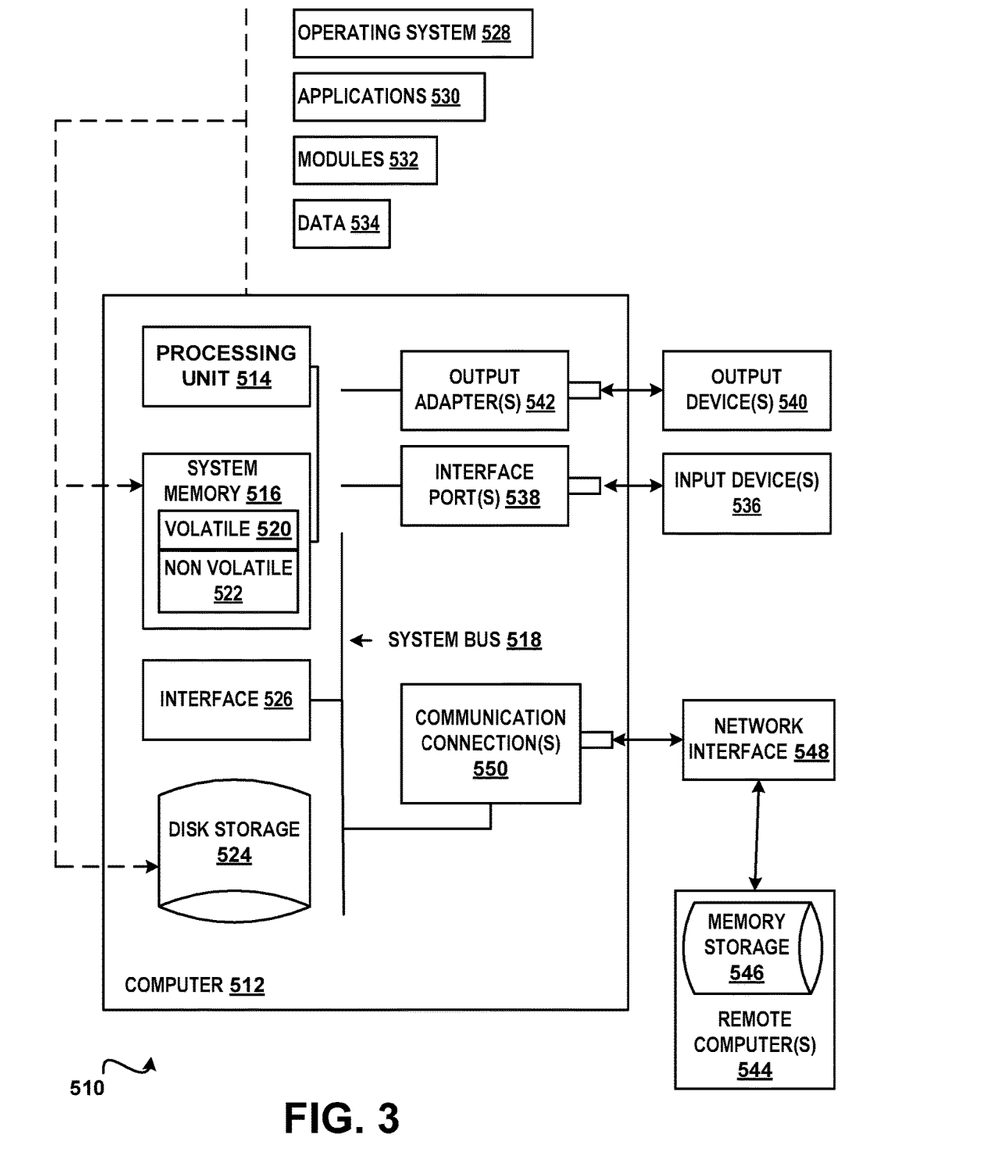
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Figure 4:
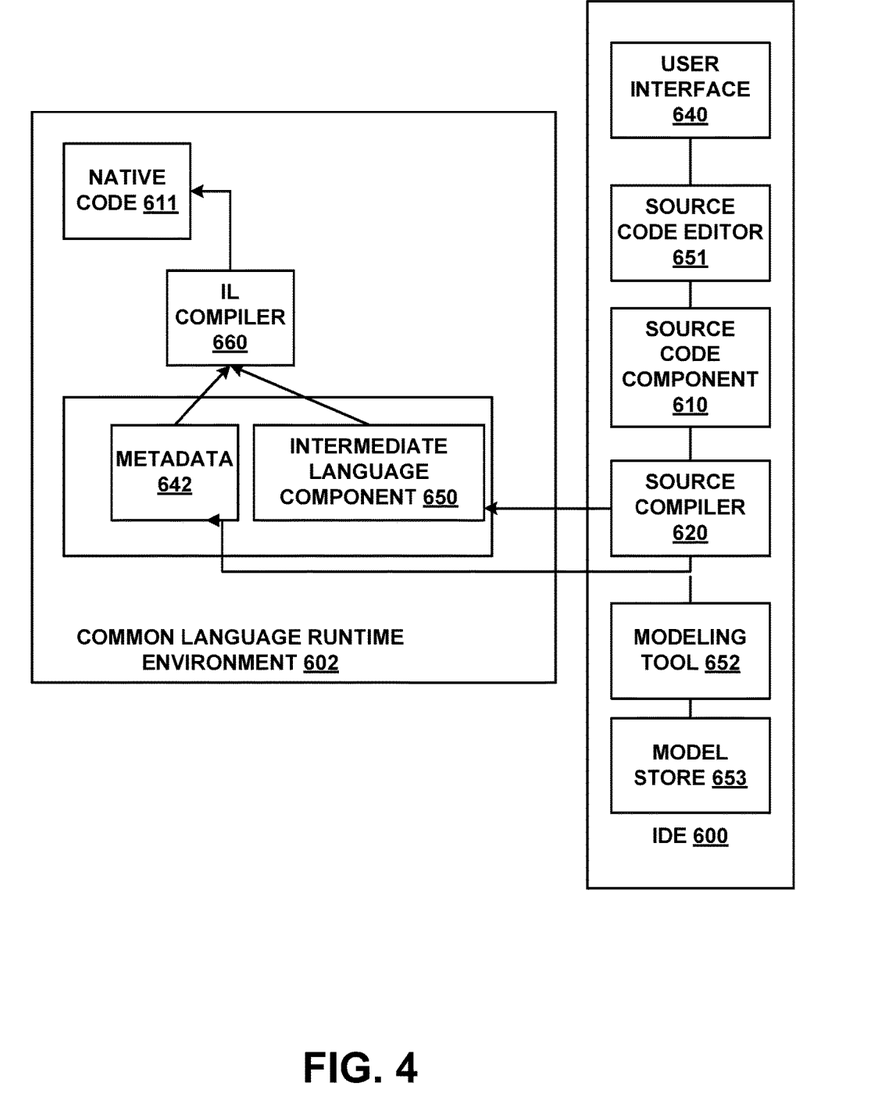
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a diagnostic workflow file by a processor of a computing device, the diagnostic workflow file comprising instructions for controlling future diagnostic operations of a debugger without user interaction with the debugger as the debugger executes, the instructions including at least one conditional diagnostic operation that is executed based on a value of a program variable;
   determining the value of the program variable; and
   collecting diagnostic information.

2. The method of claim 1, further comprising:
   collecting the diagnostic information by making a snapshot of process data.

3. The method of claim 1, further comprising:
   displaying a state of the diagnostic information.

4. The method of claim 1, wherein determining the value of the program variable, further comprises:
   based on the value of the program variable, applying the at least one conditional diagnostic operation.

5. The method of claim 1,
   wherein the at least one conditional diagnostic operation is executed based on a combination of the value of the program variable and a current state of a diagnostic primitive or a current state of a diagnostic variable; and
   wherein determining the value of the program variable, further comprises determining a current state of the diagnostic primitive or a current state of the diagnostic variable.

6. The method of claim 5, wherein collecting the diagnostic information further comprises:
   based on the determination of the value of the program variable, the determination of the current state of the diagnostic primitive or the determination of the current state of the diagnostic variable, collecting the diagnostic information.

7. A system, comprising:
   at least one processor and a memory;
   wherein the at least one processor is configured to:
      obtain a diagnostic workflow file, the diagnostic workflow file including one or more conditional diagnostic instructions including one or more future diagnostic operations of a debugger executed upon occurrence of one or more conditions without user interaction with the debugger;
      insert the conditional diagnostic instructions dynamically into an executing program without stopping the executing program;
      upon occurrence of the one or more conditions in the executing program, apply at least one future diagnostic operation associated with the occurred condition without stopping the executing program; and
      collect diagnostic information.

8. The system of claim 7, wherein the one or more conditions are based on a value of a program variable, a diagnostic primitive and/or a diagnostic variable.

9. The system of claim 7, wherein the inserted conditional diagnostic instructions perform a call to a debug workflow engine that applies at least one of the one or more future diagnostic operation.

10. The system of claim 7, wherein the inserted conditional diagnostic instructions include at least one of enabling a breakpoint, disabling a breakpoint, walking a call stack, or type checking an exception.

11. The system of claim 7, wherein the at least one processor is further configured to provide the diagnostic information to the debugger.

12. The system of claim 7, wherein the at least one processor is further configured to inject a breakpoint handler into a process of the executing program.

13. The system of claim 7, wherein the inserted conditional diagnostic instructions include a non-stopping breakpoint that enables at least one of the one or more future diagnostic operations to be performed without user intervention.

14. The system of claim 7, wherein the diagnostic information includes a lightweight snapshot of a state of a process of the executing program.

15. A device, comprising:
   at least one processor and a memory;
   a debugger that receives diagnostic information from execution of a program;
   a diagnostic workflow file comprising instructions for controlling future diagnostic operations of the debugger without user interaction with the debugger as the debugger executes, the instructions including at least one conditional diagnostic operation that is executed based on a value of a program variable, a state of a diagnostic variable and/or a state of a diagnostic primitive; and
   a diagnostic workflow engine that generates the diagnostic information during execution of the program without stopping the program, the diagnostic workflow engine generating the diagnostic information upon occurrence of the value of the program variable, the state of the diagnostic variable and/or the state of a diagnostic primitive.

16. The device of claim 15, further comprising:
an instrumentation engine that inserts instructions into a function of the program, the inserted instructions configured to call the diagnostic workflow engine to execute the at least one conditional diagnostic operation without stopping the program.

17. The device of claim 15, wherein a diagnostic variable includes a variable that indicates a number of times a breakpoint has been hit, a variable that indicates if an exception of a specified type has occurred, and a variable that indicates if an exception has occurred at a call stack.

18. The device of claim 15, wherein a diagnostic primitive includes creating a breakpoint, removing a breakpoint, disabling a breakpoint, enabling a breakpoint, changing a condition of a breakpoint, enabling an exception based on a type of the enabled exception, disabling an exception based on a type of the disabled exception, conditioning exceptions based on a call stack, and stepping operations.

19. The device of claim 15, further comprising:
a runtime profiler that inserts one or more breakpoint handlers and/or one or more exception handlers into a process executing the program.

20. The device of claim 15, wherein the debugger receives the diagnostic information during a debug session.

* * * * *